United States Patent Office 3,058,720
Patented Oct. 16, 1962

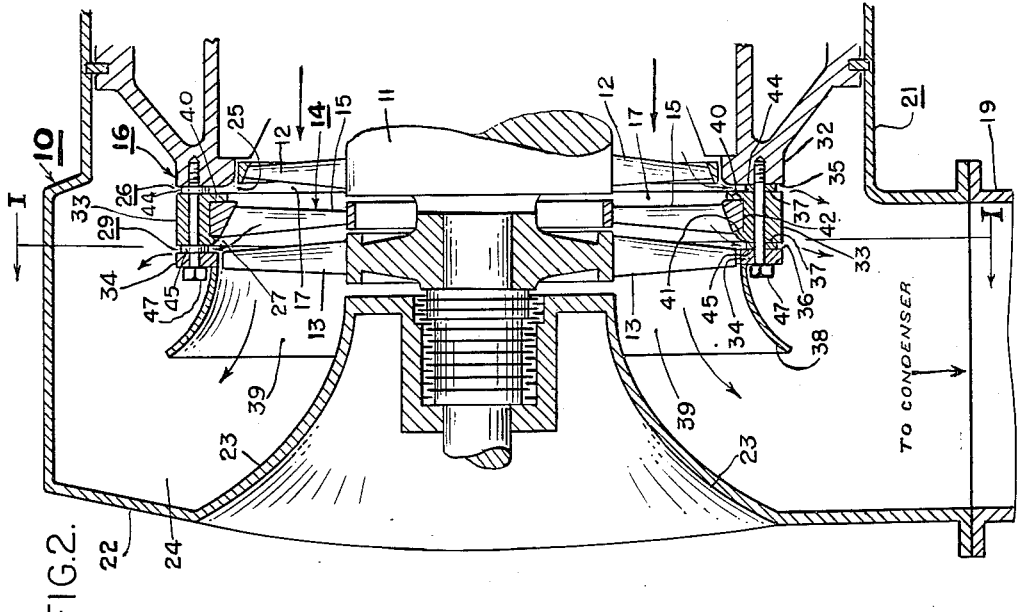
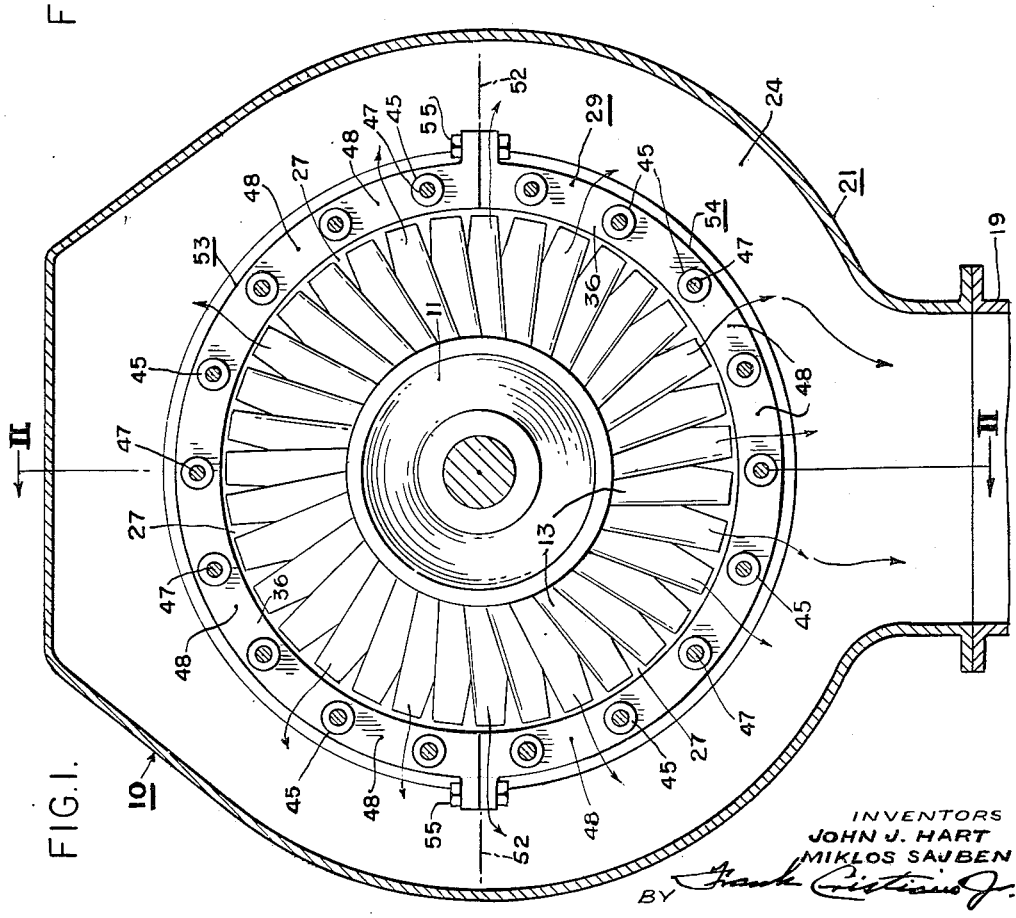

3,058,720
MOISTURE REMOVING APPARATUS FOR STEAM TURBINE OR THE LIKE
John J. Hart, Broomall, and Miklos Sajben, Media, Pa., assignors to Westinghouse Electric Corporation, East Pittsburgh, Pa., a corporation of Pennsylvania
Filed Nov. 10, 1960, Ser. No. 68,404
5 Claims. (Cl. 253—76)

This invention relates to apparatus for removing moisture from a flow passage through which a moisture-laden gas stream flows, more particularly to an arrangement for bleeding moisture from a moisture-laden motive steam passageway in a steam turbine, and has for an object to provide highly simplified, yet improved, apparatus of this type.

As well known in the art, in low pressure steam turbines it is highly desirable to remove condensate from the motive steam flow passageway to avoid excessive erosion of the blades subject to wet steam flow.

Many arrangements have heretofore been proposed with varying degrees of success. For example, in one arrangement an annular row of radially extending holes is drilled in the turbine shell structure to permit the moisture separated during flow of the motive steam through the passage to be ejected from the passage. This arrangement involves expensive manufacturing methods, since a large number of holes must be drilled in the relatively large shell structure, which shell structure is difficult to handle during manufacturing because of its large bulk and weight. In addition thereto, the moisture removal efficiency of this arrangement leaves something to be desired, since the wall structure between each pair of neighboring holes prevents the free flow of moisture from the passageway.

Another conventional arrangement employs the machining (by milling or similar operation) of an annular series of slots in the turbine shell structure. With this arrangement, considerable difficulty is encountered in machining the slots to the necessary relatively small width, since the width of the slot is determined by the width of the machining tool. Since a machine slot of this type is accordingly wider than desirable, the pressure drop across the slot is lower than desired so that, to increase the pressure drop of the moisture flow, an additional pressure throttling device must be employed, such as structure including an annular chamber encompassing the annular slot and a second annular array of annular slots forming an outlet from the annular chamber. This arrangement is quite complicated and, accordingly, expensive to manufacture. In addition to the above inherent disadvantages, a further disadvantage is the probability that, due to the thermal distortions attained during operation of the turbine, the slot will partially close in some portions thereof in a highly unpredictable manner, so that the resulting moisture removal therethrough is non-uniform.

It is a further object of the invention to provide moisture removing apparatus in which the tubular shell structure defining the moisture-laden fluid passageway is provided with an annular slot, the uniformity and width of which may be controlled with a very high degree of precision, ranging from a width on the order of .001 or .002 of an inch to any greater width desired.

In accordance with the invention, the tubular wall structure defining the flow passage for the moisture-laden fluid stream is divided into a pair of annular wall portions each of which is formed with a planar end face. The wall portions are maintained in axially spaced registry with each other by an annular array of spacer members interposed between the end faces, and means, such as an annular array of bolts, is further provided for retaining the wall portions in clamped abutting relation with the spacer members. Accordingly, the end faces jointly define an annular opening, the width of which is determined by the thickness of the spacer members. During operation, the moisture separated from the fluid stream passage is directed through the annular opening. The spacer members preferably are "washer-like" in form, i.e., flat perforated discs, and may be machined or otherwise formed to a thickness of any desired value within any desired manufacturing tolerances, depending upon the precision desired.

With this arrangement, the width of the annular opening thus formed may be maintained at the optimum value so that the pressure drop or throttling across the opening may be adjusted to any precalculated value. Further, if during service of the apparatus, conditions of the moisture-laden fluid flow change so that it is desirable to modify the width of the annular opening, the modification may be effected in a highly expeditious and economical manner by removing the spacers and substituting a new set of spacers of the desired thickness and precision.

These and other objects are effected by the invention as will be apparent from the following description taken in connection with the accompanying drawings, forming a part of this application, in which:

FIG. 1 is a transverse section of a low pressure steam turbine embodying the invention, the section being taken on line I—I of FIG. 2; and FIG. 2 is an axial section of the downstream portion of the turbine taken on line II—II of FIG. 1.

Referring to the drawing in detail, there is shown a portion of a multi-stage axial flow steam turbine 10 including a rotor 11 having a plurality of annular rows of blades 12 and 13 mounted thereon in any suitable manner. Interposed between the rotor blade rows 12 and 13 is a stationary diaphragm structure 14 having an annular row of nozzle blades 15. Tubular wall structure or shell structure generally designated 16, is disposed in encompassing relation with the rotor and nozzle blades 12, 13 and 15, and the shell structure 16 jointly with the rotor 11 defines an annular flow passage 17 for the motive steam. As well known in the art, motive steam is supplied to the passage 17 in any suitable manner from any suitable source (not shown) and, during flow past the blades, the steam is expanded to impart rotational energy to the rotor 11. During such expansion, the steam may attain saturation values with attendant formation of moisture which impinges and collects on the blades.

The steam turbine 10, in the example shown, is of the low pressure type exhausting to any suitable condenser 19 and having an outer tubular shell structure 21 disposed in encompassing relation with the shell structure 16. The outer shell structure 21 is further provided with an annular exhaust hood structure 22 having a centrally disposed fairing member 23 of generally frusto-conical shape, the upstream end of which substantially coincides with the circumference of the rotor 11, and defining an annular exhaust passageway 24 for directing the stream exhausted from the passage 17 to the condenser 19 in an aerodynamically efficient manner, as well known in the art.

The moisture-laden steam flow in the passage 17 undergoes a centrifuging effect, causing the heavier moisture particles entrained in the steam flow to be thrown radially outwardly against the inner surface of the shell structure 16. For example, the row of rotating blades 12 centrifugally separates the moisture particles during flow therethrough and directs them outwardly to the annular region 25 immediately upstream of the stationary nozzle blades 15. The shell structure 16 is formed with an annular opening 26 registering with the steam passage 17 adjacent the region 25.

The stationary nozzle blades 15 also have an effect, whereby the heavy moisture particles are forced outward along the edge of the blades, directing such moisture to the inner surface of the shell structure 16 in the annular region 27 between the nozzle blades 15 and the rotor blades 13. Accordingly, the shell structure 16 is provided with a second annular opening 29 disposed immediately adjacent the region 27 and communicating with the steam passage 17.

As thus far described, the apparatus is substantially conventional. However, in accordance with the invention, the shell structure 16 is formed with a plurality of annular shell portions 32, 33 and 34. Each of the shell portions 32 and 34 is provided with a planar annular end face 35 and 36, while the intermediate shell portion 33 is provided with a pair of planar annular end faces 37. The upstream shell portion 32 is shown in fragmentary form. However, it may continue upstream with relation to steam flow therethrough to any desired length, thereby to accommodate an additional plurality of cooperating rotor and nozzle blades (not shown), as well known in the art.

The downstream shell portion 34 may be provided with a fairing member 38 of hollow conical shape cooperating with the conical fairing member 23 to form a smoothly faired exhaust outlet 39 of annular shape for the flow passage 17. The intermediate shell portion 33 encompasses the stationary nozzle blades 15 and may be provided with a pair of radially inwardly extending flanges 40 and 41 of annular form retaining the nozzle blades in an annular groove 42 formed thereby.

The annular shell portions 32, 33 and 34 are maintained in axially spaced alignment with each other by an annular array of spacer members 44 and an annular array of spacer members 45. Preferably, the spacers 44 and 45 are of washer-like or perforated disc shape with their central openings disposed in registry with an annular array of bolts 47 extending therethrough to join the shell portions 32, 33 and 34 and maintain the spacer members in clamped relation with their associated shell portions.

The annular openings 26 and 29 are substantially similar. By referring to FIG. 1 it will be noted that the annular opening 29 is divided into a series of arcuate slots 48 by the spacer members 45. However, the circumferential dimension of the slots 48 is considerably in excess of the interruption in the opening 29 presented by the spacer members 45, so that the moisture extracted from the flow passage 17 is permitted to flow through the opening 29 in a highly efficient manner. In addition thereto, since the spacer members 45 are circular in shape, any moisture impinging thereupon is smoothly guided therepast.

In operation, as the steam flows through passage 17 and past the rotor blades 12, the moisture is thrown radially outwardly through the annular opening 26 into the space between the inner and outer shell structure 16 and 21, respectively, and thence through the exhaust passageway 24 to the condenser 19.

In a similar manner, as the thus demoisturized steam flows past the stationary blades 15, any additional moisture still remaining in the steam flow is thrown radially outwardly through the annular opening 29 into the space between the inner and outer shell structure 16 and 21, respectively, and thence directed to the condenser 19.

Accordingly, erosion of the stationary blades 15 and the rotor blades 13 is substantially minimized, since most of the moisture is diverted upstream thereof. Some of the steam is also unavoidably diverted with the moisture, thereby reducing the useful energy of the steam that would otherwise be available. Accordingly, the flow of steam across the openings 26 and 29 must be maintained within preselected limits. With the arrangement described, the width of the openings 26 and 29 is easily maintained to precise preselected values, thereby insuring that the steam flow obtained in operation is maintained at the optimum or desired value.

The thickness of the spacer members 44 and 45 has been highly exaggerated for the sake of clarity. However, in practice, the thickness of the spacers is considerably less than that shown with respect to the associated structure and may be on the order of from several thousandths of an inch to one-eighth inch, under normal circumstances. Since the spacer members 44 and 45 are completely finished to their final optimum dimensions before assembly, their thickness may be maintained within any desired manufacturing tolerances. Accordingly, the spacer members 44 and 45 maintain the shell portions 32, 33 and 34 in precisely spaced registry.

Although in the embodiment shown, the shell structure 16 has been formed with two annular openings 26 and 29 for removing moisture from the flow passage, it will be understood that, if desired, only one such passageway may be provided. Further, the thickness of the spacer members 44 may be larger, smaller or equal to the thickness of the spacer members 45.

By referring to FIG. 1, it will be noted that the shell structure 16 is axially divided along a horizontal centerline 52, with the upper and lower semicylindrical halves 53 and 54 bolted together by suitable bolting 55. This is not an essential feature of the invention but is employed for ease of assembly.

It will now be seen that the invention provides a tubular shell structure defining a fluid flow passage and having an annular opening extending therethrough for removal of moisture from a moisture-laden fluid stream, which opening may be formed with a high degree of precision and uniformity of width in a simple and economical manner.

While the invention has been shown in but one form, it will be obvious to those skilled in the art that it is not so limited, but is susceptible of various changes and modifications without departing from the spirit thereof.

What is claimed is:

1. Moisture removing apparatus comprising tubular shell structure defining a flow passage for a moisture-laden fluid stream, means disposed in said passage for separating the moisture from said fluid stream, said shell structure including a pair of annular shell portions, each of said shell portions having an end face, and means for maintaining said shell portions in axially spaced registry with each other, said last-mentioned means including an annular array of spacer members of predetermined thickness disposed between said end faces and means for clamping said shell portions to each other and maintaining said spacer members in abutment with said end faces, said end faces jointly defining an annular opening through which the separated moisture is removed from said flow passage, and said opening having a width determined by the thickness of said spacer members.

2. Moisture removing apparatus comprising tubular shell structure defining a flow passage for a moisture-laden fluid stream, means disposed in said passage for separating the moisture from said fluid stream, said shell structure including a pair of annular shell portions, each of said shell portions having an annular end face, and means for maintaining said shell portions in axially spaced registry with each other, said last-mentioned means including an annular array of spacer members of predetermined thickness disposed between said end faces and an annular array of bolts for retaining said shell portions in clamped abutting relation with said spacers, said spacer members having openings for receiving said bolts, and said end faces jointly defining an annular opening of uniform width through which the separated moisture is removed from said flow passage, said width being equal to the thickness of said spacer members.

3. An axial flow steam turbine having a tubular shell structure defining an axially extending motive steam passage, a rotor centrally disposed in said passage and having an annular row of blades, a diaphragm disposed in said passage concentrically with said rotor and having an annular row of blades, at least one of said row of blades directing moisture from the motive steam in radially outwardly direction, said tubular shell structure including a pair of annular shell portions, each of said shell portions having an annular end face, means including an annular array of spacer members of predetermined substantially similar thickness disposed between said end faces and maintaining said shell portions in axially spaced alignment with each other, and means for joining said shell portions to each other, and retaining said spacer members in clamped relation therewith, said end faces jointly defining an annular opening for directing the separated moisture through said shell structure, said opening being disposed adjacent said blades and having a width equal to said spacer thickness.

4. An axial flow steam turbine having an inner tubular shell structure defining an axially extending motive steam passage, an outer shell structure disposed in spaced encompassing relation with said inner shell structure and jointly therewith defining an exhaust space, a rotor centrally disposed in said passage and having an annular row of blades, a diaphragm disposed in said passage concentrically with said rotor and having an annular row of blades, one of the rows of blades being effective to separate and direct moisture from the motive steam in radially outwardly direction, said inner tubular shell structure including a pair of annular shell portions, one of said shell portions supporting said diaphragm, each of said shell portions having an annular end face, means including an annular array of spacer members of predetermined thickness disposed between said end faces and maintaining said shell portions in axially spaced alignment with each other, and means for retaining said shell portions in clamped abutting relation with said spacer members, said end faces jointly defining an annular opening providing a communication between said motive steam passage and said exhaust space, whereby to permit flow of the separated moisture from said passage to said space.

5. An axial flow steam turbine having axially divided tubular shell structure defining an axially extending motive steam passage, a rotor centrally disposed in said passage and having an annular row of blades, a diaphragm disposed in said passage concentrically with said rotor and having an annular row of blades, at least one of the rows of blades being effective to separate and direct moisture from the steam in radially outwardly direction, said tubular shell structure including first and second pairs of axially divided annular shell portions, each of said pairs of shell portions having an annular end face, means including an annular array of perforated spacer discs of predetermined thickness disposed between said end faces and maintaining said pairs of shell portions in predetermined axially spaced alignment with each other, and an annular array of bolts extending through said discs and retaining said shell portions in clamped relation with said discs, said end faces jointly defining an annular opening extending through said shell structure for removing the separated moisture from said passage, said opening being disposed intermediate said rows of blades.

References Cited in the file of this patent

UNITED STATES PATENTS

| | | |
|---|---|---|
| 2,188,741 | Roberts | Jan. 30, 1940 |
| 2,282,894 | Sheldon | May 12, 1942 |
| 2,897,917 | Hunter | Aug. 4, 1959 |